May 26, 1959     E. E. SCHOESSOW     2,888,292
CLOSURE FOR A PRESSURE VESSEL
Filed July 15, 1955
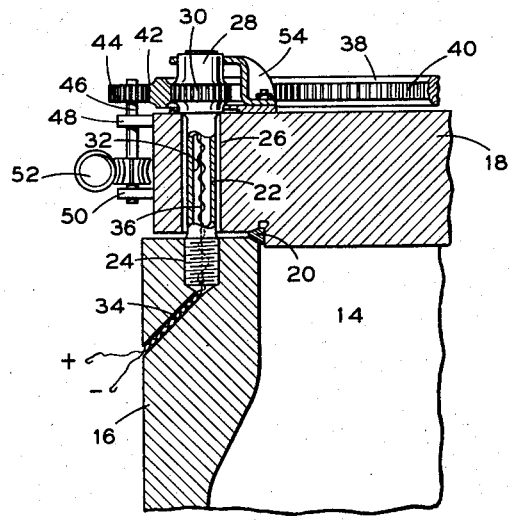
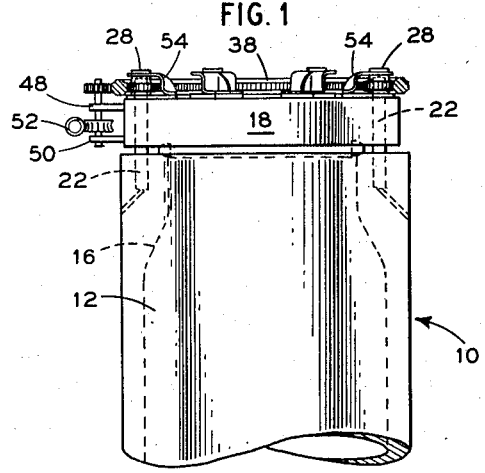
INVENTOR.
EARL E. SCHOESSOW
BY
ATTORNEY

United States Patent Office 2,888,292
Patented May 26, 1959

2,888,292

CLOSURE FOR A PRESSURE VESSEL

Earl E. Schoessow, Barberton, Ohio, assignor to The Babcock & Wilcox Company, New York, N.Y., a corporation of New Jersey Application July 15, 1955, Serial No. 522,237

7 Claims. (Cl. 292—256.73)

This invention relates in general to a closure for a pressure vessel, and more particularly, it relates to a bolted flange type of the pressure vessel closure.

In some of the modern day processes it has become necessary to open and close the closures of pressure vessels by mechanical means from a remote position. Such remote operation requires that the number of mechanical operations required to perform the opening and closing be of a minimum number in order to reduce the complexity of the equipment required to effect such operations. Further, the equipment which is used to secure the closure must be effective to uniformly apply a compressive force at the line of juncture of the closure and the pressure part in such a manner as to avoid overstressing of the parts while effecting a fluid tight relationship therebetween.

It is also important in a bolted flange type closure that the amount of tension in each bolt be controlled in such a manner that the stress in the bolts is within the elastic limit of their material and yet be sufficient to effect adequate compressive force between the closure and the pressure part.

The present invention is directed to a closure for a pressure vessel in which there is a closure member engageable with a pressure part at an opening therein and having a plurality of bolting means arranged to force the closure member into fluid tight relationship with the pressure part. Each bolting means is arranged with an electrical heating element disposed within it to heat the bolting means to a predetermined temperature. Further, means is provided for imposing a predetermined tension in the heated bolting means, such that upon cooling of the bolting means there will result an increased tension in the bolting means with a consequential greater compressive force between the closure and the pressure part.

The various features of novelty which characterize the invention are pointed out with particularity in the claims annexed to and forming a part of this specification, but for a better understanding of the invention, its operating advantages and specific objects attained by its use, reference should be had to the accompanying drawings and descriptive matter in which there is illustrated and described a preferred embodiment of the invention.

Of the drawings:

Fig. 1 is a side view of a pressure closure utilizing the present invention; and Fig. 2 is a partial side section of the closure at the juncture of the closure and the pressure part.

A pressure vessel 10 is formed with circular wall 12 and has an opening 14 at which there is formed a flange 16. A closure member 18 is constructed and arranged to be engageable with the flange 16 of the pressure vessel 10 by bearing on an interposed compressible gasket 20. Disposed in a circle about the outer portion of the closure member and pressure part there are a number of bolting means 22. Each such means is arranged to screw into a hole 24 in the flange 16 and to pass through one of the holes 26 in the closure member. A nut 28 is arranged to be screwed onto the upper end portion of each of the bolting means and the nut has gear teeth 30 on its outer periphery. Thus when the bolting means is secured in the hole 24 of the flange 16 the nut 28 may be rotated so as to place the bolting means 22 in tension to a predetermined value, thus forcing the closure member 18 and flange 16 against the gasket 20 to create a fluid tight joint.

Each bolting means 22 is further arranged to have a longitudinal bore 32 therethrough. Disposed within each bore 32 there is an electrical heating device 36 having its leads passed through the hole 34 in the flange 16 and the plus or minus terminal of such leads being connected to any controllable electrical source (not shown). The heating devices 36 in the bolting means are arranged to impart a predetermined temperature to the bolting means in order that when the nut 28 is rotated on the heated bolting means to impart an initial predetermined tension in the bolting means, subsequent cooling of the heated bolting means will effect increased tension, such tension being the amount necessary to properly provide a fluid tight joint between the closure member 18 and the flange 16.

In order to accomplish the tightening of the closure in a uniform manner, each of the bolting means 22 and heating elements 36 therein are calibrated to give a known and substantially equal resultant thermal expansion and contraction. Having these parts so calibrated, there is provided means for imposing a uniform initial tension in the bolting means. This means consists of a bull gear 38 having internal gear teeth 40 engaging the gear teeth 30 of each of the nuts 28, such that rotation of the ring 38 causes a proportional movement of each of the nuts 28. The bull gear 38 also has external gear teeth 42 arranged to mesh with a pinion gear 44 from which the bull gear receives its driving power. The pinion 44 is mounted on a drive shaft 46, which shaft is rotatably supported in the support pedestals 48 and 50. A worm gear drive assembly 52 is arranged to provide the power drive to the shaft 46 and pinion 44 to thus rotate the bull gear 38. The power for the gear drive may be obtained from any of the known types, such as an electrical motor. As the bull gear is rotated to relieve the tension on the bolting means and as the nuts 28 are backed off of the bolting means there are nut guide and retaining members 54 placed to assure that each nut 22 will always be in operative position irrespective of whether it is on the bolting means bolt or not.

When the nuts 28 are free of the bolting means 22 the closure 18 may be removed from the pressure vessel 10 to allow access to the interior thereof. The removal of the closure 18 may be accomplished by a crane or any other suitable mechanical means which can be controlled from a remote position.

Although the described embodiment is shown with respect to a flat closure member on a cylindrical vessel, it is apparent that the invention may be applied to the annular type of flange which is commonly used to secure two portions in fluid tight relationship. Further, it is intended that the above heated bolt arrangement be used on externally applied clamps, rather than direct bolted closures.

It is intended that the power may be applied to the bull gear arrangement by other means than the worm gear drive, such means could be a pinion drive, a rack drive, or other well known drives.

The bolts may be heated either by radiation, conduction, or resistance heating to accomplish the purpose of the invention.

The invention provides a means for imposing a predetermined compressive force between a closure member and a closure part by providing a heated bolting means in tension, which, upon cooling, provides the required compressive load.

Further, the present invention provides a means for uniformly imposing the initial tension on the heated bolting means without requiring manual manipulation thereof, and in such a way that the operation may be performed by mechanical means from a remote position.

While in accordance with the provision of the statutes I have illustrated and described herein a specific form of the invention now known to me, those skilled in the art will understand that changes may be made in the form of the apparatus disclosed without departing from the spirit of the invention covered by the claims, and that certain features of the invention may sometimes be used to advantage without a corresponding use of the other features.

I claim:

1. In combination, a pressure vessel having an opening therein, a closure member engageable with the pressure vessel at said opening, a plurality of bolts with rotatable nuts thereon arranged to force said closure member into fluid tight relationship with said pressure vessel, electrical heating device disposed within and arranged to heat said bolts to a predetermined temperature, and means common to and engaging each of said nuts for simultaneously placing a predetermined tension in all of said heated bolts.

2. In combination, a pressure vessel having an opening therein, a closure member engageable with the pressure vessel at said opening, a plurality of bolts arranged to force said closure member into fluid tight relation with said pressure vessel, means for heating the bolts to a predetermined temperature, a nut on each bolt arranged to force said closure member and pressure vessel into a fluid tight relationship, and means common to and engaging each of said nuts for simultaneously rotating all of the nuts to place a predetermined tension in each heated bolt.

3. In combination, a pressure vessel of circular cross section having an opening therein, a closure member engageable with the pressure vessel at said opening, a plurality of bolts arranged to force said closure member into fluid tight relation with said pressure vessel, electrical heating device disposed within and arranged to heat each bolt to a predetermined temperature, a nut on each bolt arranged to force said closure member and pressure vessel into a fluid tight relationship, and having gear teeth on the external surface thereof, a bull gear arranged to mesh with the gear teeth of the nut of all bolts and means for rotating said bull gear to place a predetermined tension in each bolt.

4. In combination, a pressure vessel having an opening therein, a readily removable closure member engageable with said pressure vessel at said opening, a plurality of nut and bolt means for securing said closure to said vessel, said bolt means uniformly elongated by heating of the same for exerting a uniformly distributed force for maintaining said closure and vessel in fluid tight sealing relationship in operative position upon subsequent cooling of the same and means for simultaneously engaging and rotating each of said nuts an equal amount to impose a uniform initial tension on said bolts.

5. A pressure vessel having an opening therein, a removable closure adapted to close said opening, bolting means including a plurality of co-operating bolts and nuts for securing said closure to said vessel in fluid tight sealing relationship in operative position, said nut imposing an initial predetermined tension on said bolt to force said closure into sealing position, means for heating said bolt to a predetermined temperature whereby upon subsequent cooling of said bolt said tension is increased to provide fluid tight seal between said vessel and closure, means for simultaneously rotating said nuts an equal amount to impose a uniform initial tension on said bolts and means for remotely controlling the simultaneously rotating of said nut rotating means.

6. In combination, a pressure vessel having an opening therein, a removable closure member engageable with said pressure vessel at said opening, a plurality of bolts and rotatable nuts adapted to screw thereon arranged to force said closure member into fluid tight relationship with said pressure vessel, electrical heating means disposed within and arranged to heat said bolts to a predetermined temperature, means for simultaneously placing a predetermined tension in all of said heated bolts, and nut guide and retaining means connected to said closure member for maintaining the nuts thereon in operative position whether said closure is in operative or inoperative position.

7. A pressure vessel having an opening therein, a readily removable closure adapted to close said opening, means for remotely removing said closure from operative sealing position to inoperative unsealed position, said means including a plurality of co-operating bolts and nuts for securing said closure to said vessel in fluid tight relationship in operative position, said nut having external gear teeth thereon, a bull ring having internal gear teeth meshing with the external gear teeth of each nut whereby rotation of said bull ring imposes an initial predetermined and uniformly distributed tension on said bolt to force said closure into sealing position, nut guide and retaining means connected to said closure member for maintaining said nuts in operative position whether said closure is in operative or inoperative position, means for heating said bolt to a predetermined temperature whereby upon subsequent cooling of said bolt said tension is increased to provide fluid tight seal between said vessel and closure, and means for remotely rotating said bull ring.

References Cited in the file of this patent

UNITED STATES PATENTS

| 131,699 | Miller | Sept. 24, 1872 |
| 1,682,338 | Hodgkinson | Aug. 28, 1928 |
| 2,173,443 | Schuman | Sept. 19, 1939 |
| 2,294,636 | Stearns | Sept. 1, 1942 |

FOREIGN PATENTS

| 660,052 | Great Britain | Oct. 31, 1951 |